United States Patent
Nakajima et al.

(10) Patent No.: US 9,321,936 B2
(45) Date of Patent: Apr. 26, 2016

(54) ADDITION CURABLE SILICONE EMULSION RELEASE COMPOSITION AND RELEASE FILM

(71) Applicant: Shin-Etsu Chemical Co., Ltd., Tokyo (JP)

(72) Inventors: Tsutomu Nakajima, Annaka (JP); Shinji Irifune, Annaka (JP); Kenji Yamamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 588 days.

(21) Appl. No.: 13/773,723

(22) Filed: Feb. 22, 2013

(65) Prior Publication Data
US 2013/0224502 A1     Aug. 29, 2013

(30) Foreign Application Priority Data

Feb. 23, 2012 (JP) ................................. 2012-036920

(51) Int. Cl.
| | |
|---|---|
| C08J 3/03 | (2006.01) |
| C08L 83/04 | (2006.01) |
| C09D 183/04 | (2006.01) |
| C08G 77/12 | (2006.01) |
| C08G 77/20 | (2006.01) |
| C08G 77/00 | (2006.01) |

(52) U.S. Cl.
CPC ............... *C09D 183/04* (2013.01); *C08L 83/04* (2013.01); *C08G 77/12* (2013.01); *C08G 77/20* (2013.01); *C08G 77/80* (2013.01); *Y10T 428/31663* (2015.04)

(58) Field of Classification Search
CPC ........ C08G 77/12; C08G 77/20; C08G 77/80; C08L 83/04; C09D 183/04; Y10T 428/31663
USPC ......... 428/447, 41.4; 524/500, 366, 375, 376; 525/478, 477; 528/15, 31, 32
See application file for complete search history.

(56) References Cited

U.S. PATENT DOCUMENTS

| | | | |
|---|---|---|---|
| 3,900,617 A | 8/1975 | Grenoble | |
| 5,095,067 A | 3/1992 | Hara et al. | |
| 5,104,927 A | 4/1992 | Hara et al. | |
| 5,468,815 A * | 11/1995 | Boardman | C09D 183/04 525/478 |
| 5,500,148 A | 3/1996 | Ohba et al. | |
| 6,794,444 B2 | 9/2004 | Yamamoto et al. | |
| 2003/0035965 A1 * | 2/2003 | Irifune | C08L 83/04 428/447 |
| 2003/0134131 A1 * | 7/2003 | Yamamoto | C09D 183/04 428/447 |
| 2005/0164017 A1 * | 7/2005 | Irifune | C08J 7/047 428/447 |
| 2008/0015326 A1 * | 1/2008 | Kodama | C08L 83/04 528/15 |
| 2011/0287267 A1 * | 11/2011 | Hori | C08G 77/10 428/447 |
| 2013/0330562 A1 * | 12/2013 | Irifune | C09J 7/0228 428/447 |
| 2015/0218410 A1 * | 8/2015 | Matsubayashi | C08L 83/04 252/500 |

FOREIGN PATENT DOCUMENTS

| | | |
|---|---|---|
| EP | 1 323 796 A2 | 7/2003 |
| EP | 1 557 451 A1 | 7/2005 |
| GB | 1 599 209 | 9/1981 |
| JP | 54-52160 A | 4/1979 |
| JP | 57-53143 B2 | 11/1982 |
| JP | 63-314275 A | 12/1988 |
| JP | 6-57144 A | 3/1994 |
| JP | 11-222557 A | 8/1999 |
| JP | 3824072 B2 | 9/2006 |
| JP | 2009-263505 | * 8/2009 |
| JP | 2009-227976 | * 12/2009 |
| JP | 2009-227977 | * 12/2009 |
| JP | 2012-207125 | * 10/2012 |
| JP | 2012-207126 | * 10/2012 |
| WO | WO 2012/132681 | * 10/2012 |
| WO | WO 2012/132682 | * 10/2012 |

OTHER PUBLICATIONS

Machine translation of JP 2012-207126, retrieved Sep. 18, 2015.*
Machine translation of JP JP 2012-207125, retrieved Sep. 18, 2015.*
Machine translation of JP 2009-227976, retrieved Sep. 18, 2015.*
Machine translation of JP 2009-227977, retrieved Sep. 18, 2015.*
Machine translation of JP 2009-263505, retrieved Sep. 18, 2015.*
Extended Europeean Search Report issued Jun. 28, 2013, in European Patent Application No. 13156230.8.

* cited by examiner

*Primary Examiner* — Callie Shosho
*Assistant Examiner* — Michael B Nelson
(74) *Attorney, Agent, or Firm* — Birch, Stewart, Kolasch & Birch, LLP

(57) ABSTRACT

An addition curable silicone emulsion release composition suitable for forming a releasable film having a high releasability to a pressure sensitive adhesives simultaneously with good adhesion to a plastic film substrate is provided. A release film prepared by coating and curing such composition on a plastic film is also provided. The good adhesion and the high releasability to acryl pressure sensitive adhesives are realized despite the low content of the organopolysiloxane containing a large amount of trifunctional siloxane units and alkenyl groups which had been used for realizing the adhesion. The addition curable silicone emulsion release composition is prepared by blending predetermined proportion of mixtures of high molecular weight organopolysiloxanes each containing an alkenyl group and phenyl group at particular ratio.

4 Claims, No Drawings

ADDITION CURABLE SILICONE EMULSION RELEASE COMPOSITION AND RELEASE FILM

CROSS-REFERENCE TO RELATED APPLICATION

This non-provisional application claims priority under 35 U.S.C. §119(a) on Patent Application No. 2012-036920 filed in Japan on Feb. 23, 2012, the entire contents of which are hereby incorporated by reference.

TECHNICAL FIELD

The present invention relates to an addition curable silicone emulsion release composition suitable for use in forming a releasable film exhibiting a high releasability to pressure sensitive adhesives simultaneously with good adhesion to a plastic film substrate. The present invention so relates to release film prepared by coating and curing such composition on a plastic film.

BACKGROUND ART

Various silicone compositions have been used for the release paper which prevents sticking and bonding of the substrate such as paper and plastics to a pressure-sensitive adhesive material. Of the silicone compositions, solvent-type silicones have been widely used in view of their release properties and relatively wide choice of the substrate.

However, reduction in the amount of solvent used and recycling of the solvent with no discharge into the exterior are recent demands in view of environmental pollution, safety, hygiene, and the like. With regard to the solvent reduction, use of a solventless silicone is effective. However, homogeneous coating of such solventless silicone on a substrate such as a paper, laminated paper, or plastic film at a thickness of up to 1 μm requires use of an expensive coater and high skill, and change from a solvent-type silicone to a solventless silicone is not generally employable.

Another effective method for reducing the solvent use is use of an emulsion-type silicone. The silicones of such type are already used, and exemplary such emulsion-type silicones include a mixture of an emulsion comprising an organovinyl polysiloxane, a platinum compound, an emulsifier, and water and an emulsion comprising an organohydrogenpolysiloxane, an emulsifier, and water (JP-B S57-53143), the one produced by emulsion polymerization (JP-A S54-52160), and an organovinylsiloxane and an organohydrogensiloxane which have been emulsified by using a particular emulsifier, and which has been further mixed with an emulsion of a platinum compound (JP-A S63-314275).

These emulsion-type silicones can be diluted with water to any desired degree, and the expensive coater and high skill required in the case of the solventless silicones are not required. Another merit is similarity of the process with the solvent-type silicone.

At present, however, the emulsion-type silicones are not widespread because of the demerits that the dispersion medium is water. One such demerit is the high latent heat of vaporization of the water which inevitably results in the curing at a high temperature, namely, lower curability compared to the solvent-type and the solventless silicones. Another major demerit is the large surface tension of the water which results in the inferior wettability of the substrate, and hence, poor adhesion. These demerits are serious particularly in the case of the plastic film substrate, and these are the reason for the rare use of the emulsion-type silicones.

Many improvements have been proposed to solve the problems as described above. Exemplary such improvements include use of an organopolysiloxane having an alkenyl group at the terminal of the molecule (JP-A H06-57144), and blending of an emulsion comprising a non-silicone polymer (JP-A H11-222557). However, many of these improvements are directed to paper substrates, and there has been little or no proposal of the silicone emulsion which exhibits satisfactory adhesion when the emulsion is coated on a plastic film substrate.

In view of the situation as described above, the inventors of the present invention made various investigations and reported that a silicone emulsion composition mainly comprising an organopolysiloxane wherein a trifunctional siloxane unit (T unit) constitutes about 35 to 60% by mole in the entire siloxane units and an alkenyl group constitutes at least 20% by mole in the entire organic groups exhibits good adhesion to the plastic film substrate (JP 3824072). While this composition exhibits good adhesion to various plastic substrates, an organopolysiloxane containing a large amount of trifunctional siloxane units and alkenyl groups constituted at least 50% by weight of this composition as the component realizing the adhesion, and it has been difficult to realize a sufficiently high releasability to acryl pressure-sensitive adhesives.

In the meanwhile, higher releasability tends to be required for the release films used for a plastic film substrate such as those used in optical applications and electronic and electric component applications. However, there has been no silicone emulsion release agent for plastic films which satisfied such demand.

SUMMARY OF INVENTION

Technical Problem

The present invention has been completed in view of the situation as described above, and an object of the present invention is to provide an addition curable silicone emulsion release composition which is suitable for use in forming a releasable film exhibiting releasability to pressure-sensitive adhesives simultaneously with good adhesion to plastic film substrates. Another object of the present invention is to provide a release film prepared by coating such composition of a plastic film and curing the coated composition.

Solution to Problem

In order to achieve the objects as described above, and more specifically, in order to obtain a film which does not experience loss of adhesion when content of the organopolysiloxane containing a large amount of trifunctional siloxane units and alkenyl groups added for realizing the adhesion is reduced and which exhibits high releasability to acryl pressure sensitive adhesive, the inventors of the present invention made an intensive investigation and found that the silicone film prepared by curing the addition curable silicone emulsion release composition containing the following components as its main components, which has been prepared by blending predetermined proportion of mixtures of high molecular weight organopolysiloxanes each containing an alkenyl group and phenyl group at particular ratio, exhibits sufficient adhesion to the substrate as well as high releasability. The present invention has been completed on the bases of such findings.

Accordingly, the present invention provides an addition curable silicone emulsion release composition and a release film as described below.

[1] An addition curable silicone emulsion release composition comprising the following components (A) to (E):

(A) 10 to 40 parts by weight of an organopolysiloxane (I) having a viscosity at 25° C. of 5 to 100 mPa·s represented by the following average compositional formula (1):

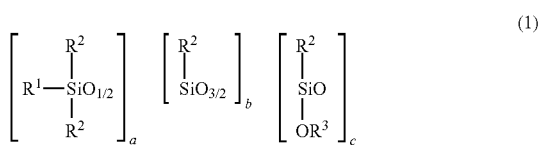

wherein $R^1$ is independently an alkenyl group containing 2 to 8 carbon atoms; $R^2$ is independently a substituted or unsubstituted monovalent hydrocarbon group containing 1 to 10 carbon atoms; $R^3$ is independently hydrogen atom or a substituted or unsubstituted monovalent hydrocarbon group containing 1 to 10 carbon atoms and not containing an aliphatic unsaturated bond; and letters a and b are positive numbers and letter c is 0 or a positive number such that $(b+c)/a=0.6$ to $1.5$ and $0 \leq c/(b+c) \leq 0.05$;

(B) 20 to 70 parts by weight of an organopolysiloxane (II) having a viscosity at 25° C. of 30 to 10,000 mPa·s represented by the following average compositional formula (2):

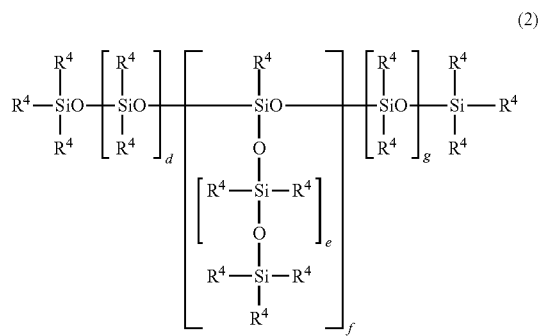

wherein $R^4$ is independently a substituted or unsubstituted monovalent hydrocarbon group containing 1 to 10 carbon atoms, with the proviso that at least two $R^4$ are an alkenyl group; and d and g are a positive number and e and f are 0 or a positive number so that viscosity at 25° C. is 30 to 10,000 mPa·s with the proviso that f is in the range of $0 \leq f \leq 10$;

(C) 1 to 10 parts by weight of an organopolysiloxane (III) having a number average molecular weight of 100,000 to 900,000, and containing an alkenyl group with alkenyl value of at least 0.01 mol/100 g;

(D) 5 to 30 parts by weight of an organopolysiloxane (IV) having a number average molecular weight in the range of 100,000 to 900,000, and having an alkenyl group and an aryl group with the alkenyl value of at least 0.0002 mol/100 g and less than 0.01 mol/100 g, and amount of the aryl group in all organic groups of 0.5 to 10% by mol;

content of the component (A) being up to 40% by weight of the total content of the component (A), the component (B), the component (C), and the component (D), and content of the component (C) and the component (D) being such that (C)/(D)=1/9 to 5/5 (weight ratio); and (E) an organohydrogenpolysiloxane (V) having at least 3 hydrogen atoms directly bonded to silicon atoms per molecule, and having a viscosity at 25° C. is 5 to 2,000 mPa·s represented by the following average compositional formula (3):

$$R^5{}_h H_k SiO_{(4-h-k)/2} \quad (3)$$

wherein $R^5$ is a substituted or unsubstituted monovalent hydrocarbon group containing 1 to 10 carbon atoms and not containing an aliphatic unsaturated bond; and h and k are positive numbers satisfying $h+k \leq 3$;

molar ratio of the SiH group in the component (E) to all alkenyl groups in the components (A) to (D) (amount of the SiH group/amount of the alkenyl group) being 1.0 to 3.0.

[2] An addition curable silicone emulsion release composition according to [1] further comprising (F) 0.1 to 20 parts by weight of a surfactant;

(G) a catalytic amount of a platinum group metal catalyst; and (H) 50 to 100,000 parts by weight of water in relation to 100 parts by weight of the total of the components (A) to (E).

[3] A release film produced by coating the addition curable silicone emulsion release composition of [1] or [2] on a plastic film, and curing the coated composition.

Advantageous Effects of Invention

The addition curable silicone emulsion release composition of the present invention realizes good adhesion to the film substrate irrespective of the type of the plastic film substrate. In addition, the cured film formed can be used as a release film since it exhibits high releasability to pressure-sensitive adhesives.

DESCRIPTION OF EMBODIMENTS

Next, the present invention is described in detail.

The addition curable silicone emulsion release composition of the present invention mainly comprises components (A) to (E) as described below.

(A) an organopolysiloxane (I) having a viscosity at 25° C. is 5 to 100 mPa·s represented by the following average compositional formula (1):

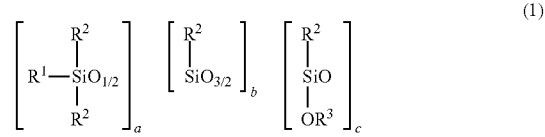

wherein $R^1$ is independently an alkenyl group containing 2 to 8 carbon atoms; $R^2$ is independently a substituted or unsubstituted monovalent hydrocarbon group containing 1 to 10 carbon atoms; $R^3$ is independently hydrogen atom or a substituted or unsubstituted monovalent hydrocarbon group containing 1 to 10 carbon atoms and not containing an aliphatic unsaturated bond; and a and b are positive numbers and c is 0 or a positive number such that $(b+c)/a=0.6$ to $1.5$ and $0 \leq c/(b+c) \leq 0.05$.

(B) an organopolysiloxane (II) having a viscosity at 25° C. of 30 to 10,000 mPa·s represented by the following average compositional formula (2):

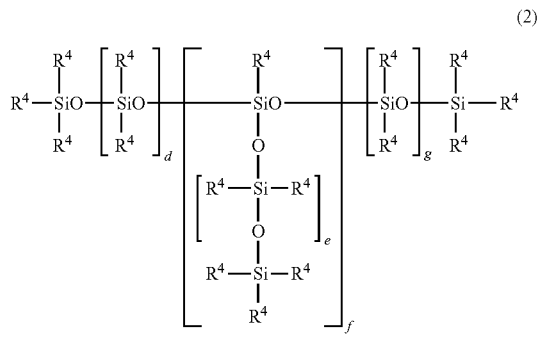

wherein $R^4$ is independently a substituted or unsubstituted monovalent hydrocarbon group containing 1 to 10 carbon atoms, with the proviso that at least two $R^4$ are an alkenyl group; and d and g are a positive number and e and f are 0 or a positive number so that viscosity at 25° C. is 30 to 10,000 mPa·s with the proviso that f is in the range of $0 \leq f \leq 10$.

(C) an organopolysiloxane (III) having a number average molecular weight of 100,000 to 900,000, and containing an alkenyl group with alkenyl value of at least 0.01 mol/100 g.

(D) an organopolysiloxane (IV) having a number average molecular weight in the range of 100,000 to 900,000, and having an alkenyl group and an aryl group with the alkenyl value of at least 0.0002 mol/100 g and less than 0.01 mol/100 g, and amount of the aryl group in all organic groups of 0.5 to 10% by mol.

(E) an organohydrogenpolysiloxane (V) having at least 3 hydrogen atoms directly bonded to the silicon atom per molecule, and having a viscosity at 25° C. is 5 to 2,000 mPa·s represented by the following average compositional formula (3):

$$R^5{}_h H_k SiO_{(4-h-k)/2} \qquad (3)$$

wherein $R^5$ is a substituted or unsubstituted monovalent hydrocarbon group containing 1 to 10 carbon atoms and not containing an aliphatic unsaturated bond; and h and k are positive numbers satisfying $h+k \leq 3$.

The organopolysiloxane (I) which is the component (A) constituting the addition curable silicone emulsion release composition of the present invention has a viscosity at 25° C. of 5 to 100 mPa·s, and this organopolysiloxane (I) is represented by the following average compositional formula (1):

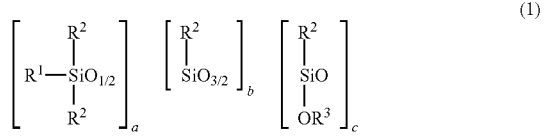

In the formula (1), $R^1$ is an alkenyl group containing 2 to 8 carbon atoms such as vinyl group, allyl group, butenyl group, and pentenyl group. Preferably, $R^1$ is vinyl group.

$R^2$ is independently a substituted or unsubstituted monovalent hydrocarbon group containing 1 to 10 carbon atoms, and in particular, 1 to 6 carbon atoms selected from alkyl groups such as methyl group, ethyl group, propyl group, and butyl group, cycloalkyl groups such as cyclohexyl group, alkenyl groups such as vinyl group, allyl group, butenyl group, and pentenyl group, aryl groups such as phenyl group and tolyl group, and any one of such groups having a part or all of the hydrogen atoms bonded to the carbon atom substituted with hydroxyl group, cyano group, or a halogen atom such as hydroxypropyl group, cyanoethyl group, 1-chloropropyl group, and 3,3,3-trifluoropropyl group; and $R^2$ is preferably methyl group or vinyl group. $R^1$ and $R^2$ may be the same of different.

$R^3$ is hydrogen atom or a substituted or unsubstituted monovalent hydrocarbon group not containing an aliphatic unsaturated bond and containing 1 to 10 carbon atoms, and in particular, 1 to 6 carbon atoms selected from alkyl groups such as methyl group, ethyl group, propyl group, and butyl group, cycloalkyl groups such as cyclohexyl group, aryl groups such as phenyl group and tolyl group, and any one of such groups having a part or all of the hydrogen atoms bonded to the carbon atom substituted with hydroxyl group, cyano group, or a halogen atom such as hydroxypropyl group, cyanoethyl group, 1-chloropropyl group, and 3,3,3-trifluoropropyl group; and $R^3$ is preferably methyl group.

In industrial point of view, the alkenyl group of the organopolysiloxane (I) is preferably vinyl group. Amount of the alkenyl group in the organopolysiloxane (I) is preferably an amount such that its alkenyl value is 0.50 to 0.65 mol/100 g, and in particular 0.53 to 0.62 mol/100 g.

Letters a and b are independently a positive number and letter c is 0 or a positive number. Preferably, letter a is a positive number of $0 < a \leq 50$, letter b is a positive number of $0 < b \leq 50$, and letter c is $0 \leq c \leq 5$.

Ratio (b+c)/a is in the range of 0.6 to 1.5, and preferably 0.8 to 1.3. Ratio (b+c)/a of less than 0.6 will result in the loss of the adhesion to the plastic film substrate which is characteristic to the present invention, while ratio (b+c)/a in excess of 1.5 will result in the unduly increased content of the $R^2 SiO_{3/2}$ and the $R^2(R^3O)SiO_{2/2}$ which in turn results in the difficulty of synthesizing the organopolysiloxane (I). Ratio c/(b+c) is in the range of 0 to 0.05, and preferably 0 to 0.03. Ratio c/(b+c) in excess of 0.05 will result in the excessive content of the alkoxy group or the hydroxy group, which in turn results in the poor curability of the silicone emulsion release composition.

The viscosity at 25° C. of the organopolysiloxane (I) is in the range of 5 to 100 mPa·s, and preferably 20 to 80 mPa·s. When the viscosity is less than 5 mPa·s, the resulting silicone emulsion release composition will have a poor storage stability while viscosity in excess of 100 mPa·s will result in the difficulty of synthesizing the organopolysiloxane (I). In the present invention, the viscosity may be measured by using a rotary viscometer.

The organopolysiloxane (I) may also contain a monofunctional siloxane unit, a difunctional siloxane unit, or a tetrafunctional siloxane unit not having an alkenyl group at an amount not adversely affecting the merits of the present invention.

The component (A) may be incorporated at an amount in the range of 10 to 40 parts by weight in relation to 100 parts by weight of the total of the components (A) to (D), and the content is preferably in the range of 10 to 30 parts by weight in order to realize the sufficient adhesion simultaneously with the easy release. In order to realize the easy release, content of the component (A) should be up to 40% by weight of the components (A) to (D). Excessively low content of the component (A) results in the poor adhesion.

Next, the organopolysiloxane (II) of the component (B) has a viscosity at 25° C. of 30 to 10,000 mPa·s, and this organopolysiloxane (II) is represented by the following average compositional formula (2):

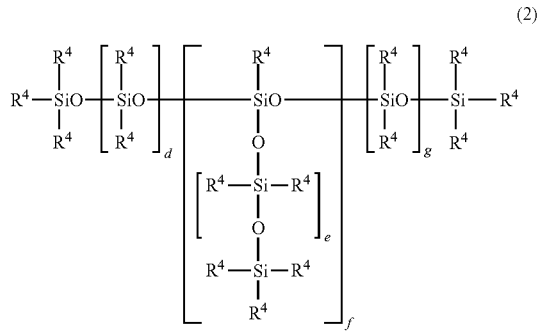

(2)

In the formula (2), $R^4$ is independently a substituted or unsubstituted monovalent hydrocarbon group containing 1 to 10 carbon atoms, and in particular, 1 to 6 carbon atoms selected from alkyl groups such as methyl group, ethyl group, propyl group, and butyl group, cycloalkyl groups such as cyclohexyl group, alkenyl groups such as vinyl group, allyl group, butenyl group, and pentenyl group, aryl groups such as phenyl group and tolyl group, and any one of such groups having a part or all of the hydrogen atoms bonded to the carbon atom substituted with hydroxyl group, cyano group, or a halogen atom such as hydroxypropyl group, cyanoethyl group, 1-chloropropyl group, and 3,3,3-trifluoropropyl group. At least 2, and preferably 2 to 6 of the $R^4$ are an alkenyl group. $R^4$ is preferably methyl group or vinyl group.

In the organopolysiloxane (II), amount of the alkenyl group is preferably an amount such that its alkenyl value is 0.003 to 0.1 mol/100 g, and in particular, 0.005 to 0.05 mol/100 g.

The viscosity at 25° C. of the organopolysiloxane (II) is in the range of 30 to 10,000 mPa·s, and preferably 50 to 500 mPa·s. When the viscosity is less than 30 mPa·s, the silicone emulsion release composition will have poor storage stability, while sufficiently cured film will not be obtained at the viscosity in excess of 10,000 mPa·s. Letter f is in the range of $0 \leq f \leq 10$, and preferably 0 to 3, and d, e, and g are not particularly limited, and may be selected so that the organopolysiloxane (II) has the viscosity in the range as described above. The organopolysiloxane (II) wherein f is in excess of 10 will be gelated during the synthesis, and production of such organopolysiloxane (II) will be difficult.

The organopolysiloxane (II) is the component which has a large effect on the releasability of the silicone emulsion release composition of the present invention. Release properties of the cured film of the silicone emulsion release composition can be adjusted by changing structure and substituents of the organopolysiloxane (II). The organopolysiloxane (II) may not necessarily comprise single component, and it may be a mixture of several organopolysiloxanes each having different compositions as long as the average compositional formula of the components satisfies the requirements as described above.

The component (B) may be incorporated at an amount in the range of 20 to 70 parts by weight, and preferably, at 30 to 60 parts by weight in relation to 100 parts by weight of the total of the components (A) to (D). Curability will be insufficient and reliability will also be insufficient when the content of the component (B) is excessively low while excessive incorporation will result in the insufficient adhesion to the film substrate.

Next, the organopolysiloxane (III) of the component (C) has a number average molecular weight of 100,000 to 900,000, and this contains an alkenyl group without fail, and the alkenyl value is at least 0.01 mol/100 g.

The alkenyl group may be selected from those containing 2 to 8 carbon atoms such as vinyl group, allyl group, butenyl group, and pentenyl group. Industrially preferable alkenyl group is vinyl group.

The alkenyl value is at least 0.01 mol/100 g, and preferably at least 0.02 mol/100 g. The alkenyl value of less than 0.01 mol/100 g will result in the loss of adhesion. The alkenyl value is preferably at least 0.1 mol/100 g.

The monovalent group directly bonded to the silicon atom other than the alkenyl group are not particularly limited, and examples include substituted or unsubstituted monovalent hydrocarbon groups containing 1 to 10 carbon atoms, and in particular, 1 to 6 carbon atoms selected from alkyl groups such as methyl group, ethyl group, propyl group, and butyl group, cycloalkyl groups such as cyclohexyl group, aryl croups such as phenyl group and tolyl group, and any one of such groups having a part or all of the hydrogen atoms bonded to the carbon atom substituted with hydroxyl group, cyano group, or a halogen atom such as hydroxypropyl group, cyanoethyl group, 1-chloropropyl group, and 3,3,3-trifluoropropyl group. Among these, the preferred is methyl group.

The organopolysiloxane (III) is not particularly limited for its molecular structure, while it may preferably have a straight chain molecular structure. The number average molecular weight is in the range of 100,000 to 900,000, and preferably 200,000 to 700,000. The number average molecular weight of less than 100,000 results in the reduced adhesion while the number average molecular weight in excess of 900,000 results in poor stability of the emulsion.

The number average molecular weight used in the present invention is the number average molecular weight measured by gel permeation chromatography (GPC) conducted under the conditions as described below using polystyrene as standard substance.

[Measurement Conditions]
Developing solvent: toluene
Flow rate: 0.35 ml/min.
Detector: differential refractive index detector (RI)
Column: product name, TOSOH SuperHZ 4000, SuperHZ 3000, SuperHZ 2000 (manufactured by Tosoh)
Column temperature: 40° C.
Amount of the sample added:
  20 μL (toluene solution at a concentration of 0.5% by weight)

The component (C) may be used at an amount in the range of 1 to 10 parts by weight, and preferably 3 to 10 parts by weight in relation to the total of the to components (A) to (D). Excessively low amount of the component (C) results in poor adhesion while excessive use also results in the poor adhesion.

The organopolysiloxane (IV) of the component (D) has a number average molecular weight in the range of 100,000 to 900,000, and this organopolysiloxane (IV) has an alkenyl group and an aryl group without fail, and the alkenyl value is at least 0.0002 mol/100 g and less than 0.01 mol/100 g, and amount of the aryl group is 0.5 to 10% by mol of all organic groups.

The alkenyl group used is the one containing 2 to 8 carbon atoms such as vinyl group, allyl group, butenyl group, and pentenyl group, and the preferred is vinyl group in industrial point of view.

The alkenyl value is at least 0.0002 mol/100 g and less than 0.01 mol/100 g, preferably at least 0.001 mol/100 g and less than 0.01 mol/100 g, and more preferably 0.0015 to 0.005 mol/100 g. The value of less than 0.0002 mol/100 g will result in poor curability while the value of 0.01 mol/100 g or more will result in poor adhesion.

The aryl group used may be the one containing 6 to 12 carbon atoms such as phenyl group and tolyl group, and the preferred is phenyl group in industrial point of view.

Content of the aryl group is such that amount of the aryl group in the entire organic group is 0.5 to 10% by mol, and preferably 1 to 3% by mol. The amount of the aryl group of less than 0.5% by mol or more than 10% by mol will result in poor adhesion.

The monovalent group other than the alkenyl group and the aryl group directly bonded to silicon atom is not particularly limited, and examples include a substituted or unsubstituted monovalent hydrocarbon group containing 1 to 10 carbon atoms, and in particular, 1 to 6 carbon atoms excluding the alkenyl groups and the aryl groups such as alkyl groups such as methyl group, ethyl group, propyl group, and butyl group, cycloalkyl groups such as cyclohexyl group, and any of such groups having a part of all of the hydrogen atoms bonded to the carbon atom substituted with hydroxyl group, cyano group, halogen atom, or the like such as hydroxypropyl group, cyanoethyl group, 1-chloropropyl group, and 3,3,3-trifluoropropyl group. Among these, the preferred is methyl group.

The organopolysiloxane (IV) is not particularly limited for its molecular structure, while it may preferably have a straight chain molecular structure. The number average molecular weight is in the range of 100,000 to 900,000, and preferably 200,000 to 700,000. The number average molecular weight of less than 100,000 results in the reduced adhesion while the number average molecular weight in excess of 900,000 results in poor stability of the emulsion.

The component (D) may be used at an amount in the range of 5 to 30 parts by weight, and preferably 7 to 25 parts by weight in relation to 100 parts by weight of the total of the components (A) to (D). Excessively low amount of the component (D) results in poor adhesion while excessive use also results in the poor adhesion.

In the present invention, the adhesion is greatly influenced by the weight ratio of the component (C) to the component (D), and it is important that (C)/(D) is 1/9 to 5/5 (weight ratio). The weight ratio (C)/(D) is more preferably 2/8 to 4/6. Sufficient adhesion is not realized then the ratio (C)/(D) is less than 1/9 or greater than 5/5.

The organopolysiloxane (V) of the component (E) is the organopolysiloxane represented by the following average compositional formula (3):

$$R^5_h H_k SiO_{(4-h-k)/2} \qquad (3)$$

wherein at least 3 hydrogen atoms are directly bonded to the silicon atom per molecule, and this organopolysiloxane (V) has a viscosity at 25° C. of 5 to 2,000 mPa·s.

In the formula (3), $R^5$ is a substituted or unsubstituted monovalent hydrocarbon containing 1 to 10 carbon atoms, and in particular, 1 to 6 carbon atoms not containing an aliphatic unsaturated bond selected from alkyl groups such as methyl group, ethyl group, propyl group, and butyl group, cycloalkyl groups such as cyclohexyl group, aryl groups such as phenyl group and tolyl group, and any of such groups having a part or all of the hydrogen atoms bonded to the carbon atom substituted with hydroxyl group, cyano group, halogen atom, or the like such as hydroxypropyl group, cyanoethyl group, 1-chloropropyl group, and 3,3,3-trifluoropropyl group. Rc is preferably methyl group or ethyl group.

Letters h and k are positive numbers satisfying h+k≤3. Preferably, h is a positive number of 0<h≤2, k is a positive number of 0<k≤1, and h+k is a positive number of 2 to 3.

The organohydrogenpolysiloxane (V) is an organohydrogenpolysiloxane having at least 3, and preferably 3 to 100 hydrogen atoms directly bonded to silicon atoms per molecule, and the amount of the SiH group is 0.2 to 1.6 mol/100 g, and preferably 1 to 1.6 mol/100 g.

The organohydrogenpolysiloxane (V) is incorporated at an amount such that molar ratio of the SiH group in the component (E) to all alkenyl groups in the components (A) to (D) (amount of the SiH group/amount of the alkenyl group) is 1.0 to 3.0, and more preferably, 1.2 to 2.0. When this ratio is less than 1.0, curability will be greatly reduced while the ratio in excess of 3.0 will result in excessively increased release force.

The addition curable silicone emulsion release composition of the present invention preferably further comprises
(F) a surfactant,
(G) a platinum group metal catalyst, and
(H) water.

Examples of the surfactant (F) include nonionic surfactants such as alkylether surfactants such as polyoxyethylene laurylether and polyoxyethylene tridecylether, and alkyl ester surfactants such as polyoxyethylene oleate and polyoxyethylene laurate, and these nonionic emulsifiers may be used alone or in combination of two or more. In view of producing a stable silicone emulsion release composition, HLB of the nonionic emulsifier or its mixture is preferably 10 to 15.

An anionic surfactant or a cationic surfactant may also be used. However, such surfactant is preferably used in combination with a nonionic surfactant in view of the stability of the silicone emulsion and wettability in the application to the substrate.

The surfactant is preferably used at the minimum amount required to realize sufficient stability of the silicone emulsion and substrate wettability. More specifically, the surfactant is preferably used at an amount of 0.1 to 20 parts by weight, and more preferably 0.5 to 15 parts by weight in relation to 100 parts by weight of the total of the components (A) to (E). Use at an amount of less than 0.1 parts by weight may result in the difficulty of the emulsification while use at an amount in excess of 20 parts by weight may result in poor curability of the silicone emulsion.

A water-soluble resin may be used in combination with the surfactant to improve emulsification and stability of the resulting emulsion. Exemplary water-soluble resins include polyvinyl alcohol, and the water-soluble resin selected should be the one exhibiting least catalyst poisoning to the platinum group metal catalyst. The water-soluble resin is preferably used at the minimum amount required to realize sufficient stability of the silicone emulsion and substrate wettability as in the case of the surfactant. More specifically, the water-soluble resin is preferably used at an amount of 0.1 to 20 parts by weight, and more preferably 1 to 10 parts by weight in relation to 100 parts by weight of the total of the components (A) to (E).

The platinum group metal catalyst (G) is a catalyst used for promoting the addition reaction, and any known addition catalyst may be used for this purpose. Examples of the platinum group metal catalyst include catalysts such as platinum, palladium, and rhodium catalysts, and among these, the preferred are platinum catalysts such as chloroplatinic acid, alcohol solution or aldehyde solution of chloroplatinic acid, and complex of chloroplatinic acid with various olefin or vinyl siloxane.

The platinum group metal catalyst may be used at a catalytic amount, and preferably, at an amount of the platinum group metal of 1 to 1,000 ppm in relation to 100 parts by weight of the total of the components (A) to (E) in order to obtain good cured film and in economic point of view.

Preferably, the platinum group metal catalyst (G) is not emulsified simultaneously with other components, and the platinum group metal catalyst (G) may be added immediately before the use of the emulsion after preparing the emulsion of the components (A) to (E). The platinum group metal catalyst is preferably prepared in water dispersible form before its addition, for example, by preliminarily mixing with a surfactant.

The silicone emulsion release composition of the present invention may be prepared by a method known in the art. For example, the silicone emulsion release composition may be prepared by mixing the predetermined amount of the components (A) to (G) and a part of the water (H) by using a high shearing agitator such as planetary mixer or combi-mixer, emulsifying the mixture by phase transfer method, adding residual part of the water (H), and diluting the emulsion. Each of these components may comprise single or two or more components.

Amount of the water (H) is not particularly limited as long as viscosity suitable for the coater actually used in the coating and desired coating weight of the composition on the substrate are realized. The amount used is preferably 50 to 100,000 parts by weight, and in particular, 100 to 10,000 parts by weight in relation to 100 parts by weight of the total of the components (A) to (E) (the organopolysiloxanes (I) to (V)). At less than 50 parts by weight, production of an O/W-type emulsion will be difficult, and the stability will be poor at the amount in excess of 100,000 parts by weight.

The water used is not particularly limited as long as the impurity in the water is at the level of tap water. Use of water contaminated with strong acid, strong alkali, large concentration alcohol, salts, or the like is unsuitable for use since the resulting emulsion suffers from poor stability.

In addition to the components as described above, the composition may also include other optional components, for example, a catalytic inactivator such as an organic nitrogen compound, organic phosphor compound, acetylene derivative, oxime compound, or organic halide for suppressing catalytic activity of the platinum group metal catalyst; silicone resin, silica, or an organopolysiloxane not containing hydrogen atom or an alkenyl group bonded to the silicon atom for controlling releasability; a leveling agent such as fluorine-based surfactant; or a thickening agent such as water-soluble polymer, for example, methylcellulose. Such optional components may be added at an amount commonly used in the art not inhibiting the merits of the present invention.

The thus prepared silicone emulsion release composition may be used as a release film by coating on a substrate which is most preferably a plastic film, and heat curing. Examples of the plastic film used include polyolefin films such as biaxially stretched polypropylene film, polyethylene film, and ethylene-propylene copolymer film, and polyester films such as polyethylene terephthalate film. The film substrate is not particularly limited for its thickness. However, the substrate may typically have a thickness of about 5 to 100 µm.

The silicone emulsion release composition of the present invention may be coated on the substrate by using gravure coater, air knife coater, roll coater, wire bar, or the like to a non-limited coating weight, which is typically about 0.1 to 2.0 g/m$^2$ in terms of the solid content of the silicone emulsion release composition (about 0.1 to 2.0 µm in thickness).

When the silicone emulsion release composition of the present invention is coated on the substrate, and heated at 80° C. to 160° C. for about 5 seconds to 3 minutes, for example, in a hot air circulation dryer, a cured film of the silicone emulsion release composition is formed on the substrate and the film will be releasable. Alternatively, the film may be cured by exposing to infrared or ultraviolet beam, or by using these method in combination to thereby improve curing efficiency.

As described above, use of the addition curable silicone emulsion release composition of the present invention enables production of a releasable plastic film which exhibits good adhesion to a plastic film substrate simultaneously with high releasability to various pressure sensitive adhesives.

EXAMPLES

Next, the present invention is described in further detail by referring to Examples and Comparative Examples which by no means limit the scope of the present invention. It is to be noted that parts and % in the following Examples and Comparative Examples are parts by weight and % by weight, and physical properties in the Tables are the measurements obtained by the following test procedures.

[Curability]

The silicone emulsion release composition immediately after the preparation was coated on a 38 µm PET (polyethylene terephthalate) film substrate to a cured silicone coating weight of 0.3 g/m$^2$, and dried in a hot air drier at 120° C. for a predetermined time. The resulting cured film was rubbed several times with finger, and the film was visually examined for haze and peeling. The curability is indicated by the time (second) required for the curing.

[Adhesion]

The silicone emulsion release composition immediately after the preparation was coated on a 38 µm PET film substrate to a cured silicone coating weight of 0.3 g/m$^2$, and dried in a hot air drier at 120° C. for 30 seconds. The resulting cured film was stored at room temperature for 1 day, and then rubbed several times with finger. The film was visually examined for haze and peeling (initial adhesion). This release film was also stored in a thermostat bath oven at 50° C. for 14 days, and the cured film was rubbed several times with finger and the film was visually examined for haze and peeling (prolonged adhesion).

[Release Force]

The silicone emulsion release composition immediately after the preparation was cured at 120° C. for 30 seconds by the same procedure as the measurement of the curability to prepare a release film. An acryl pressure-sensitive adhesive BPS-5127 (manufactured by Toyo Ink Mfg. Co., Ltd.) was coated on the release surface of the release film, and heated at 100° C. for 3 minutes. Next, the same release film was adhered to this coated surface, and the sample was cut at a width of 5 cm. After aging at room temperature for 1 day, the film was peeled off the laminate on a tensile tester at an angle of 180° at a peeling speed of 0.3 m/min, and the force (N/5 cm) required for the release was measured.

[Residual Adhesion]

A cured film of the silicone emulsion release composition was formed as in the case of the release force measurement, and a polyester tape No. 31B (manufactured by Nitto Denko Corporation) was adhered to its surface. A load of 1,976 Pa was placed on the tape, and the laminate was heated at 70° C. for 20 hours. The tape was peeled, and then adhered to a stainless steel plate. The tape was then peeled off the stainless steel plate, and the force (N/5 cm) required for the peeling was measured. Percentage of this force in relation to the force required for peeling a non-treated standard tape was calculated (residual adhesion).

Silicone Emulsion 1

A 5-L combined emulsifier equipped with an anchor stirrer capable of stirring the entire vessel and a rotating disc having alternately upward and downward raised small teeth arranged along its circumference (T.K. CombiMix Model M manufactured by Primix Corp.) was charged with 200 parts of an organopolysiloxane (a) having a viscosity at 25° C. of 30 mPa·s and a vinyl group content of 0.60 mol/100 g represented by the following average compositional formula:

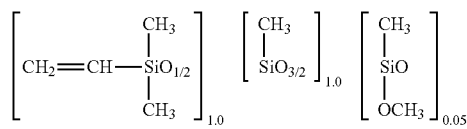

(the organopolysiloxane (I) of component (A)); 550 parts of a straight chain dimethylpolysiloxane (b) containing vinyl group at opposite ends having a viscosity of 400 mPa·s and a vinyl group content of 0.02 mol/100 g (the organopolysiloxane (II) of component (B)); 50 parts of a dimethylpolysiloxane (c) containing vinyl group at its end and in the side chain having a number average molecular weight of about 400,000, and containing vinyl group as the alkenyl group with the vinyl value of 0.04 mol/100 g to (the organopolysiloxane (III) of component (C)); 200 parts of a vinyl group- and phenyl group-containing dimethylpolysiloxane (d) containing vinyl group as the alkenyl group at its end and in the side chain with the vinyl value of 0.002 mol/100 g and phenyl group as the aryl group with the amount of the phenyl group of 1.5% by mol in relation to the total organic groups, having a number average molecular weight of about 400,000 (the organopolysiloxane (IV) of component (D)); 150 parts of methylhydrogenpolysiloxane (e) having a viscosity at 25° C. of 40 mPa·s and SiH group content of 1.2 mol/100 g (the organohydrogenpolysiloxane (V) of component (E)); 23 parts of polyoxyethylene laurylether having an HLB of 13.6 (the surfactant (f) of component (F); 1,150 parts of 10% aqueous solution of polyvinyl alcohol (the thickener); and 5 parts of ethynylcyclohexanol (the catalytic activity suppressor); and the mixture was homogeneously agitated. To this mixture, 150 parts of water was added for phase transfer, and the stirring was continued for another 30 minutes. This emulsion was transferred to a 15-L tank having an agitator, and after adding 9,047 parts of water for dilution and stirring, an O/W emulsion 1 having a silicone content of 10% was obtained.

Silicone Emulsion 2

The procedure of preparing the silicone emulsion 1 was repeated except that 350 parts of the organopolysiloxane (a) as the component (A); 550 parts of the dimethylpolysiloxane (b) containing vinyl group at opposite ends as the component (B); 10 parts of the dimethylpolysiloxane (c) containing vinyl group at its end and in the side chain as the component (C); 200 parts of the vinyl group- and phenyl group-containing dimethylpolysiloxane (d) as the component (D); 250 parts of the methylhydrogenpolysiloxane (e) as the component (E); and 25 parts of the surfactant (f) as the component (F) were used; and after adding 9,920 parts of water for dilution was added. After the stirring, an O/W emulsion 2 having a silicone content of 10% was obtained.

Silicone Emulsion 3

The procedure of preparing the silicone emulsion 1 was repeated except that 500 parts of the organopolysiloxane (a) as the component (A); 350 parts of the dimethylpolysiloxane (b) containing vinyl group at opposite ends as the component (B); 50 parts of the dimethylpolysiloxane (c) containing vinyl group at its end and in the side chain as the component (C); 100 parts of the vinyl group- and phenyl group-containing dimethylpolysiloxane (d) as the component (D); 350 parts of the methylhydrogenpolysiloxane (e) as the component (E); and 27 parts of the surfactant (f) as the component (F) were used; and 10,818 parts of water for dilution was added. After the stirring, an O/W emulsion 3 having a silicone content of 10% was obtained.

Silicone Emulsion 4

The procedure of preparing the silicone emulsion 1 was repeated except that 200 parts of the organopolysiloxane (a) as the component (A); 650 parts of the dimethylpolysiloxane (b) containing vinyl group at opposite ends as the component (B); 100 parts of the dimethylpolysiloxane (c) containing vinyl group at its end and in the side chain as the component (C); 50 parts of the vinyl group- and phenyl group-containing dimethylpolysiloxane (d) as the component (D); 150 parts of the methylhydrogenpolysiloxane (e) as the component (E); and 23 parts of the surfactant (f) as the component (F) were used; and 9,047 parts of water for dilution was added. After the stirring, an O/W emulsion 4 having a silicone content of 10% was obtained.

Silicone Emulsion 5

The procedure of preparing the silicone emulsion 1 was repeated except that 500 parts of the organopolysiloxane (a) as the component (A); 500 parts of the dimethylpolysiloxane (b) containing vinyl group at opposite ends as the component (B); no components corresponding to the components (C) and (D); 150 parts of the methylhydrogenpolysiloxane (e) as the component (E); and 27 parts of the surfactant (f) as the component (F) were used; and 10,818 parts of water for dilution was added. After the stirring, an O/W emulsion 5 having a silicone content of 10% was obtained.

Silicone Emulsion 6

The procedure of preparing the silicone emulsion 1 was repeated except that 200 parts of the organopolysiloxane (a) as the component (A); 600 parts of the dimethylpolysiloxane (b) containing vinyl group at opposite ends as the component (B); no component corresponding to the component (C); 200 parts of the vinyl group- and phenyl group-containing dimethylpolysiloxane (d) as the component (D); 150 parts of the methylhydrogenpolysiloxane (e) as the component (E); and 23 parts of the surfactant (f) as the component (F) were used; and after adding 9,047 parts of water for dilution was added. After the stirring, an O/W emulsion 6 having a silicone content of 10% was obtained.

Example 1

100 parts of the silicone emulsion 1 was blended with 1.5 parts of platinum catalyst emulsion CAT-PM-10A manufactured Shin-Etsu Chemical Co., Ltd., and the blend was thoroughly mixed for use as the silicone emulsion release composition. The composition was measured for its curability, adhesion, release force, and residual adhesion. The results are shown in Table 2.

Example 2

The procedure of Example 1 was repeated except that silicone emulsion 2 was used instead of the silicone emulsion 1. The composition was measured for its curability, adhesion, release force, and residual adhesion. The results are shown in Table 2.

Comparative Example 1

The procedure of Example 1 was repeated except that silicone emulsion 3 was used instead of the silicone emulsion 1. The composition was measured for its curability, adhesion, release force, and residual adhesion. The results are shown in Table 2.

Comparative Example 2

The procedure of Example 1 was repeated except that silicone emulsion 4 was used instead of the silicone emulsion 1. The composition was measured for its curability, adhesion, release force, and residual adhesion. The results are shown in Table 2.

Comparative Example 3

The procedure of Example 1 was repeated except that silicone emulsion 5 was used instead of the silicone emulsion 1. The composition was measured for its curability, adhesion, release force, and residual adhesion. The results are shown in Table 2.

Comparative Example 4

The procedure of Example 1 was repeated except that silicone emulsion 6 was used instead of the silicone emulsion 1. The composition was measured for its curability, adhesion, release force, and residual adhesion. The results are shown in Table 2.

TABLE 2

Release properties in Examples and Comparative Examples

| Item measured | Example 1 | Example 2 | Comparative Example 1 | Comparative Example 2 | Comparative Example 3 | Comparative Example 4 |
|---|---|---|---|---|---|---|
| Curability (sec) | 30 | 25 | 30 | 30 | 30 | 30 |
| Initial adhesion *1 | A | A | A | C | A | C |
| Prolonged adhesion *1 | A | A | A | C | A | C |
| Release force (N/5 cm) | 0.15 | 0.20 | 0.60 | 0.18 | 0.70 | 0.15 |
| Residual adhesion (%) | 95 | 97 | 95 | 95 | 95 | 95 |

*1: The adhesion was evaluated A when the film was in good condition with no haze and peeling, B when slight haze was noted, and C when peeling was observed.

Examples 1 and 2 demonstrate that the silicone emulsion release composition of the present invention exhibits good adhesion to the film substrate and high releasability.

Comparative Examples 1 and 3 demonstrate that the release force is increased when the content of the organopolysiloxane component (I) is 50% by weight or higher in the organopolysiloxane components (I) to (IV).

Examples 1 and 2 and Comparative Examples 2 and 4 demonstrate that the strong adhesion is realized simultaneously with the high releasability when the components (C) and (D) of the present invention are incorporated at a particular ratio.

INDUSTRIAL APPLICABILITY

This invention is useful in the field of release papers.

Japanese Patent Application No. 2012-036920 is incorporated herein by reference.

Although some preferred embodiments have been described, many modifications and variations may be made thereto in light of the above teachings. It is therefore to be

TABLE 1

List of the composition of Examples and Comparative Examples

| Component | Unit | Example 1 | Example 2 | Comparative Example 1 | Comparative Example 2 | Comparative Example 3 | Comparative Example 4 |
|---|---|---|---|---|---|---|---|
| (A) The component (a) corresponding to organopolysiloxane (I) | Part by weight | 20 | 35 | 50 | 20 | 50 | 20 |
| (B) The component (b) corresponding to organopolysiloxane (II) | Part by weight | 55 | 35 | 35 | 65 | 50 | 60 |
| (C) The component (c) corresponding to organopolysiloxane (III) | Part by weight | 5 | 10 | 5 | 10 | 0 | 0 |
| (D) The component (d) corresponding to organopolysiloxane (IV) | Part by weight | 20 | 20 | 10 | 5 | 0 | 20 |
| (E) The component (e) corresponding to organohydrogenpolysiloxane (V) | Part by weight | 15 | 25 | 35 | 15 | 35 | 15 |
| (A)/((A) + (B) + (C) + (D)) × 100 | % by weight | 20 | 35 | 50 | 20 | 50 | 20 |
| (C)/(D) | Weight ratio | 0.25 | 0.5 | 0.5 | 2.0 | — | — |
| Total amount of SiH group in (E)/total amount of alkenyl group in (A) to (D) | Molar ratio | 1.8 | 1.8 | 1.8 | 1.8 | 1.8 | 1.8 |
| The component (f) corresponding to the surfactant | Part by weight *1 | 2 | 2 | 2 | 2 | 2 | 2 |
| The component corresponding to water | Part by weight *2 | 1,023 | 1,111 | 1,200 | 1,023 | 1,200 | 1,023 |

*1: Part by weight in relation to 100 parts by weight of (A) + (B) + (C) + (D) + (E)
*2: Part by weight in relation to 100 parts by weight of (A) + (B) + (C) + (D) + (E)

The invention claimed is:

1. An addition curable silicone emulsion release composition comprising the following components (A) to (E):
   (A) 10 to 40 parts by weight of an organopolysiloxane (I) having a viscosity at 25° C. of 5 to 100 mPa·s represented by the following average compositional formula (1):

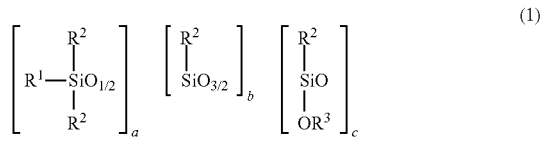

wherein $R^1$ is independently an alkenyl group containing 2 to 8 carbon atoms; $R^2$ is independently a substituted or unsubstituted monovalent hydrocarbon group containing 1 to 10 carbon atoms; $R^3$ is independently hydrogen atom or a substituted or unsubstituted monovalent hydrocarbon group containing 1 to 10 carbon atoms and not containing an aliphatic unsaturated bond; and letters a and b are positive numbers and letter c is 0 or a positive number such that $(b+c)/a=0.6$ to $1.5$ and $0 \leq c/(b+c) \leq 0.05$;
   (B) 20 to 70 parts by weight of an organopolysiloxane (II) having a viscosity at 25° C. of 30 to 10,000 mPa·s represented by the following average compositional formula (2):

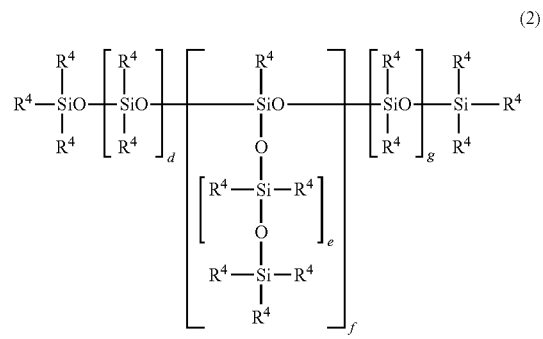

wherein $R^4$ is independently a substituted or unsubstituted monovalent hydrocarbon group containing 1 to 10 carbon atoms, with the proviso that at least two $R^4$ are an alkenyl group; and d and g are a positive number and e and f are 0 or a positive number so that the viscosity at 25° C. is 30 to 10,000 mPa·s with the proviso that f is in the range of $0 \leq f \leq 10$;
   (C) 1 to 10 parts by weight of an organopolysiloxane (III) having a number average molecular weight of 100,000 to 900,000, and containing an alkenyl group with an alkenyl value of at least 0.01 mol/100 g;
   (D) 5 to 30 parts by weight of an organopolysiloxane (IV) having a number average molecular weight in the range of 100,000 to 900,000, and having an alkenyl group and an aryl group with an alkenyl value of at least 0.0002 mol/100 g and less than 0.01 mol/100 g, and an amount of the aryl group in all organic groups of 0.5 to 10% by mol;
   content of the component (A) being up to 40% by weight of the total content of the component (A), the component (B), the component (C), and the component (D), and a weight ratio, C/D, of the content of the component (C) to the content of the component (D) is 1/9 to 5/5; and
   (E) an organohydrogenpolysiloxane (V) having at least 3 hydrogen atoms directly bonded to silicon atoms per molecule, and having a viscosity at 25° C. is 5 to 2,000 mPa·s represented by the following average compositional formula (3):

wherein $R^5$ is a substituted or unsubstituted monovalent hydrocarbon group containing 1 to 10 carbon atoms and not containing an aliphatic unsaturated bond; and h and k are positive numbers satisfying $h+k \leq 3$;
   a molar ratio of the SiH group in the component (E) to all alkenyl groups in the components (A) to (D) being 1.0 to 3.0.

2. The addition curable silicone emulsion release composition according to claim 1 further comprising, in relation to 100 parts by weight of the total of the components (A) to (E):
   (F) 0.1 to 20 parts by weight of a surfactant;
   (G) a catalytic amount of a platinum group metal catalyst; and
   (H) 50 to 100,000 parts by weight of water.

3. A release film produced by
   coating an addition curable silicone emulsion release composition comprising the following components (A) to (E):
   (A) 10 to 40 parts by weight of an organopolysiloxane (I) having a viscosity at 25° C. of 5 to 100 mPa·s represented by the following average compositional formula (1):

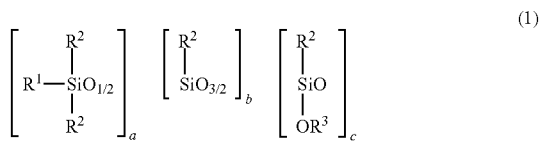

wherein $R^1$ is independently an alkenyl group containing 2 to 8 carbon atoms; $R^2$ is independently a substituted or unsubstituted monovalent hydrocarbon group containing 1 to 10 carbon atoms; $R^3$ is independently hydrogen atom or a substituted or unsubstituted monovalent hydrocarbon group containing 1 to 10 carbon atoms and not containing an aliphatic unsaturated bond; and letters a and b are positive numbers and letter c is 0 or a positive number such that $(b+c)/a=0.6$ to $1.5$ and $0 \leq c/(b+c) \leq 0.05$;
   (B) 20 to 70 parts by weight of an organopolysiloxane (II) having a viscosity at 25° C. of 30 to 10,000 mPa·s represented by the following average compositional formula (2):

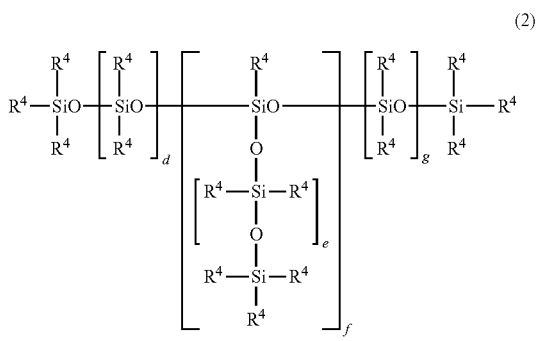
(2)

wherein $R^4$ is independently a substituted or unsubstituted monovalent hydrocarbon group containing 1 to 10 carbon atoms, with the proviso that at least two $R^4$ are an alkenyl group; and d and g are a positive number and e and f are 0 or a positive number so that the viscosity at 25° C. is 30 to 10,000 mPa·s with the proviso that f is in the range of 0≤f≤10;

(C) 1 to 10 parts by weight of an organopolysiloxane (III) having a number average molecular weight of 100,000 to 900,000, and containing an alkenyl group with an alkenyl value of at least 0.01 mol/100 g;

(D) 5 to 30 parts by weight of an organopolysiloxane (IV) having a number average molecular weight in the range of 100,000 to 900,000, and having an alkenyl group and an aryl group with an alkenyl value of at least 0.0002 mol/100 g and less than 0.01 mol/100 g, and an amount of the aryl group in all organic groups of 0.5 to 10% by mol;

content of the component (A) being up to 40% by weight of the total content of the component (A), the component (B), the component (C), and the component (D), and a weight ratio, C/D, of the content of the component (C) to the content of the component (D) is 1/9 to 5/5; and (E) an organohydrogenpolysiloxane (V) having at least 3 hydrogen atoms directly bonded to silicon atoms per molecule, and having a viscosity at 25° C. is 5 to 2,000 mPa·s represented by the following average compositional formula (3):

$$R^5{}_h H_k SiO_{(4-h-k)/2} \quad (3)$$

wherein $R^5$ is a substituted or unsubstituted monovalent hydrocarbon group containing 1 to 10 carbon atoms and not containing an aliphatic unsaturated bond; and h and k are positive numbers satisfying h+k≤3;

a molar ratio of the SiH group in the component (E) to all alkenyl groups in the components (A) to (D) being 1.0 to 3.0 on a plastic film, and curing the coated composition.

4. The release film of claim 3, wherein said addition curable silicone emulsion release composition further comprises, in relation to 100 parts by weight of the total of the components (A) to (E):

(F) 0.1 to 20 parts by weight of a surfactant;

(G) a catalytic amount of a platinum group metal catalyst; and (H) 50 to 100,000 parts by weight of water.

* * * * *